US012427092B2

(12) United States Patent
Tabor

(10) Patent No.: US 12,427,092 B2
(45) Date of Patent: Sep. 30, 2025

(54) DEVICE AND METHOD FOR ASSISTING PILL SWALLOWING

(71) Applicant: Purosil LLC, Corona, CA (US)

(72) Inventor: Rick Tabor, Crystal Lake, IL (US)

(73) Assignee: PUROSIL LLC, Corona, CA (US)

(*) Notice: Subject to any disclaimer, the term of this patent is extended or adjusted under 35 U.S.C. 154(b) by 926 days.

(21) Appl. No.: 17/518,299

(22) Filed: Nov. 3, 2021

(65) Prior Publication Data

US 2022/0133596 A1 May 5, 2022

Related U.S. Application Data

(60) Provisional application No. 63/204,972, filed on Nov. 5, 2020.

(51) Int. Cl.
*A61J 7/00* (2006.01)

(52) U.S. Cl.
CPC .................................. *A61J 7/0061* (2013.01)

(58) Field of Classification Search
CPC .... A61J 7/0061; A61J 7/0053; A61J 15/0003; A61J 9/005; A61J 1/2037; A61J 7/0076; A61J 1/10; A61J 7/0046; A61M 37/0069; A61M 5/2425; A61M 5/282; A61M 3/0262; A61M 5/148; A61M 5/1782; A61M 5/204; A61M 2005/3114; A61M 2005/5053; A61M 2005/3128; A61K 2800/92; B65D 83/04; B65D 83/0811; B65D 83/0823; B65D 83/0817; B65D 83/0852; B65D 83/0858; B65D 25/082; B65D 83/0094; B05B 11/1028; B05C 17/00583; B01L 3/505
USPC .......................... 604/514, 57, 63, 73, 75–78
See application file for complete search history.

(56) References Cited

U.S. PATENT DOCUMENTS 2,431,192 A * 11/1947 Munson ................ B65D 47/18 222/209
3,734,106 A * 5/1973 Zimmerman ...... A46B 15/0067 401/277
4,543,370 A 9/1985 Porter et al.
4,581,013 A * 4/1986 Allen .................... A61J 7/0053 604/59
5,114,720 A 5/1992 Littell et al.
(Continued)

FOREIGN PATENT DOCUMENTS

CN 210812642 U * 6/2020
JP 6624701 B1 12/2019
JP 2020078395 A * 5/2020

OTHER PUBLICATIONS

JP-2020078395-A translation by Clarivate via WIPO; Yoshito, May 28, 2020; (Year: 2020).*
(Continued)

*Primary Examiner* — Cris L. Rodriguez
(74) *Attorney, Agent, or Firm* — Dilworth IP, LLC

(57) ABSTRACT

A pill swallowing device comprising a deformable reservoir for holding an edible liquid; a liquid refilling port attached to the deformable reservoir; a pill transit port for loading and discharging pills attached to the deformable reservoir; and a cap detachably connected to the pill transit port, the cap comprising a pill-positioning insert that engages the pill, that projects into the deformable reservoir for directing the pill inside the reservoir.

10 Claims, 9 Drawing Sheets

(56) References Cited

U.S. PATENT DOCUMENTS

| | | | | |
|---|---|---|---|---|
| 5,470,581 | A | 11/1995 | Grillo et al. | |
| 6,960,183 | B2 * | 11/2005 | Nicolette | A61M 37/0069 604/82 |
| 7,455,656 | B2 | 11/2008 | Langeler et al. | |
| 9,603,805 | B2 | 3/2017 | Kudou et al. | |
| 10,232,045 | B2 | 3/2019 | Gimbel et al. | |
| 2011/0224604 | A1 * | 9/2011 | Showers | A61J 7/0061 215/386 |
| 2012/0012480 | A1 * | 1/2012 | Morimoto | A61J 7/0046 206/277 |
| 2012/0207831 | A1 | 8/2012 | Stella et al. | |
| 2013/0064889 | A1 | 3/2013 | Nutalapati et al. | |
| 2015/0005702 | A1 * | 1/2015 | Soper | A61J 7/0046 604/78 |
| 2015/0088059 | A1 * | 3/2015 | Soper | A61J 7/0046 604/78 |
| 2016/0235628 | A1 * | 8/2016 | Zelikman | A61J 3/00 |
| 2018/0311108 | A1 | 11/2018 | Nappi | |
| 2021/0316061 | A1 * | 10/2021 | Hagen | A61M 3/0245 |
| 2022/0088357 | A1 * | 3/2022 | Wills | A61M 31/00 |

OTHER PUBLICATIONS

CN-210812642-U translation google patents; Zhang, Jun. 23, 2020; (Year: 2020).*

* cited by examiner

DEVICE AND METHOD FOR ASSISTING PILL SWALLOWING

FIELD OF THE INVENTION

The present invention relates to a method and device for assisting people and animals in swallowing a capsule, tablet, or pill. More particularly, the present invention relates to a refillable, dishwasher-safe reservoir device containing an edible liquid that can be squeezed into a patient's mouth for ease of swallowing, improved aftertaste, reduced mess, and improved hygiene.

BACKGROUND

Swallowing pills is a problem for many people even if they have no general problems swallowing normally associated with dysphagia. According to a Harris Interactive poll conducted in 2004, about 40 percent of American adults have trouble swallowing pills. For those having trouble, the poll found that, of those have trouble swallowing their medications, 14 percent delayed taking doses of their medication, 8 percent skipped a dose and 4 percent discontinued using their medication. Commonly cited issues include gagging, a lingering aftertaste from an incomplete swallow, and having a pill become lodged in the throat. There can be physiological and structural reasons for difficulty swallowing pills, however, people may also simply have a fear of swallowing. Pills may be coated to mitigate swallowing difficulties, however, often the mere sight of a large pill can cause anxiety; for example, a 1-gram dose of Valayclovir is so large that it immediately raises gagging and choking fears in those required to swallow it regularly. These problems can be even more prevalent in seniors with conditions such as Parkinson's disease, Alzheimer's, other forms of dementia, and stroke, all of which can affect the ability to swallow. In addition, some people, e.g., those who are immuno-suppressed, simply have many pills to swallow every day, which only magnifies any base physical or psychological difficulties in swallowing the pills. Finally, it's not surprising that people taking pills may not feel well, so that what might not be a particularly difficult task under normal conditions can become even more burdensome. Some pills can optionally be cut into smaller pieces or ground up and poured into water or mixed into pudding to make swallowing easier, however, even these simple tasks can be onerous to those already ill. In any event, whatever the reason for difficulty swallowing, lack of compliance with certain prescription medications due to dysphagia can cause catastrophic health reactions.

Administering pills to animals presents its own challenges. Dogs, for example don't normally have difficulties swallowing, since they don't really chew their food anyway. However, they have an amazing sense of smell and can often detect that what their owner is pleading with them to swallow isn't a tasty treat after all, but a distasteful or even toxic-smelling thing that they should avoid at all costs. Placing the pill in their food dish often doesn't work, because they can simply eat around it. Wrapping the pill inside a piece of bologna or coating it with peanut butter and placing it in their dish has a better chance of success, but even this isn't foolproof, since a crafty canine can easily lick the peanut butter away or shake the pill free from the bologna. Forcing the pill into the dog's mouth typically results in a wrestling match and stalemate, with the owner holding the animal's mouth closed, the animal patiently cheeking the pill, and both trying to wait the other out. In any event, it requires placing fingers in the animal's mouth, which can not only be unpleasant, but potentially dangerous, especially if the dog is nervous, in pain, or not familiar with the person delivering the pill.

Various pill coating compositions are available for use. A pill coating product having a vanilla flavor and an extremely thick consistency is produced by Arkray and sold under the tradename Assure Slide Forte™. A pill swallowing gel (also produced by Arkray and sold under the tradename Phazix™) comes in packets, and contains water, sugar, carrageenan, maltodextrin, potassium sorbate (a preservative), calcium chloride, citric acid, and natural flavor. Both products claim to deliver tablets, capsules, and powders to the stomach without delay. Arkay's pill coating product comes in 500 mL pump bottles for use with a spoon. These products have the disadvantage that the pill, capsule, or tablet may not be completely coated by simply squirting or dripping the coating products onto a pill in a spoon. A complete coating is important to ensure that the lubricated pill has a low coefficient of friction on all sides, and thereby slides readily down the esophagus. An incomplete coating may also result in an increased chance of unpleasant aftertaste.

Other examples of edible lubricants for pills suitable for use are described in U.S. Pat. No. 5,114,720, U.S. Patent Application Publication No. 20130064889, U.S. Pat. Nos. 5,470,581, 4,543,370, 10,232,045, 9,603,805, and U.S. Patent Application No. 20120207831.

A common challenge for all these pill coating compositions, however, is how the pill is coated and subsequently delivered to the patient. As described above, one method is simply to coat a pill in a spoon, however, other attempts have been made. MEDCOAT® AB offers a product to facilitate the taking of tablets and capsules which consists of a set of open-top trays that a patient pushes a pill to create a waxy, flavored coating prior to swallowing. This tray is disposable, improving on the sterility of their device, however, the waxy coating also covers the fingers of the patient, making the system messy to use. FLAVORx Inc. offers a sprayable flavoring for use with pills under the tradename Pill Glide™. This product is sprayed into the back of the throat to improve the flavor of the pill swallowing experience. Oraflo Technologies makes a pill swallowing cup sold under the trademark Oralflo®, that is a cup with a pill reservoir built into the cap. The patient adds their favorite juice to the cup, attaches the cap, put pills into the pill reservoir and drinks the resulting juice/pill mixture to ease the process of swallowing. Apothecary Products LLC sells a pill reservoir spout under the trademark EzyDose® that fits on the end of most water bottles. This spout does not deliver flavor to counteract aftertaste, nor does it deliver an edible lubricant to reduce the coefficient of friction of the pill against the esophagus.

Other apparatus for delivering pills include U.S. Patent Application Publication No. 20180311108, U.S. Patent Application Publication No. 20160235628 U.S. Patent Application Publication No. 20120012480, U.S. Pat. Nos. 7,455,656, 6,960,183, and Japanese Patent No. JP6624701. Nevertheless, improved methods and devices are needed to aid in the swallowing of pills, tablets, and capsules. In particular, methods, devices and compositions are needed to alleviate difficulty in swallowing pills, tablets, and capsules while reducing the aftertaste of these pharmaceuticals.

SUMMARY OF THE INVENTION

The subject matter of the present disclosure relates to a pill swallowing device and a method for a patient to take a pill using the pill swallowing device.

In one embodiment, the present disclosure provides a pill swallowing device comprising a deformable reservoir for holding an edible liquid; a liquid refilling port attached to the deformable reservoir; a pill transit port for loading and discharging pills attached to the deformable reservoir; and a cap detachably connected to the pill transit port, the cap comprising a pill-positioning insert for engaging the pill and projects into the deformable reservoir for directing the pill inside the reservoir.

In another embodiment, the present disclosure provides a method for administering a pill using the pill swallowing device, the method comprising filling a deformable reservoir with an edible liquid; placing a pill in the pill transit port; attaching the cap to the pill transit port, wherein the pill-positioning insert engages the pill, and directs the pill into the edible liquid, thereby coating the pill with edible liquid; removing the cap, and squeezing the deformable reservoir to push the edible liquid-coated pill into the mouth of a person or animal for the purpose of swallowing.

In still another embodiment, the present disclosure provides a pill swallowing device comprising a deformable reservoir for holding an edible liquid; a liquid refilling port attached to the deformable reservoir; a pill transit port for loading and discharging pills attached to the deformable reservoir; and a cap detachably connected to the pill transit port, the cap comprising a pill-positioning insert that projects into the pill transit port, engages the pill and directs the pill into the deformable reservoir.

BRIEF DESCRIPTION OF THE DRAWINGS

The subject matter of the present disclosure will be more fully understood from the following detailed description, taken in connection with the accompanying drawings, in which.

DETAILED DESCRIPTION OF THE INVENTION

Figure 1:
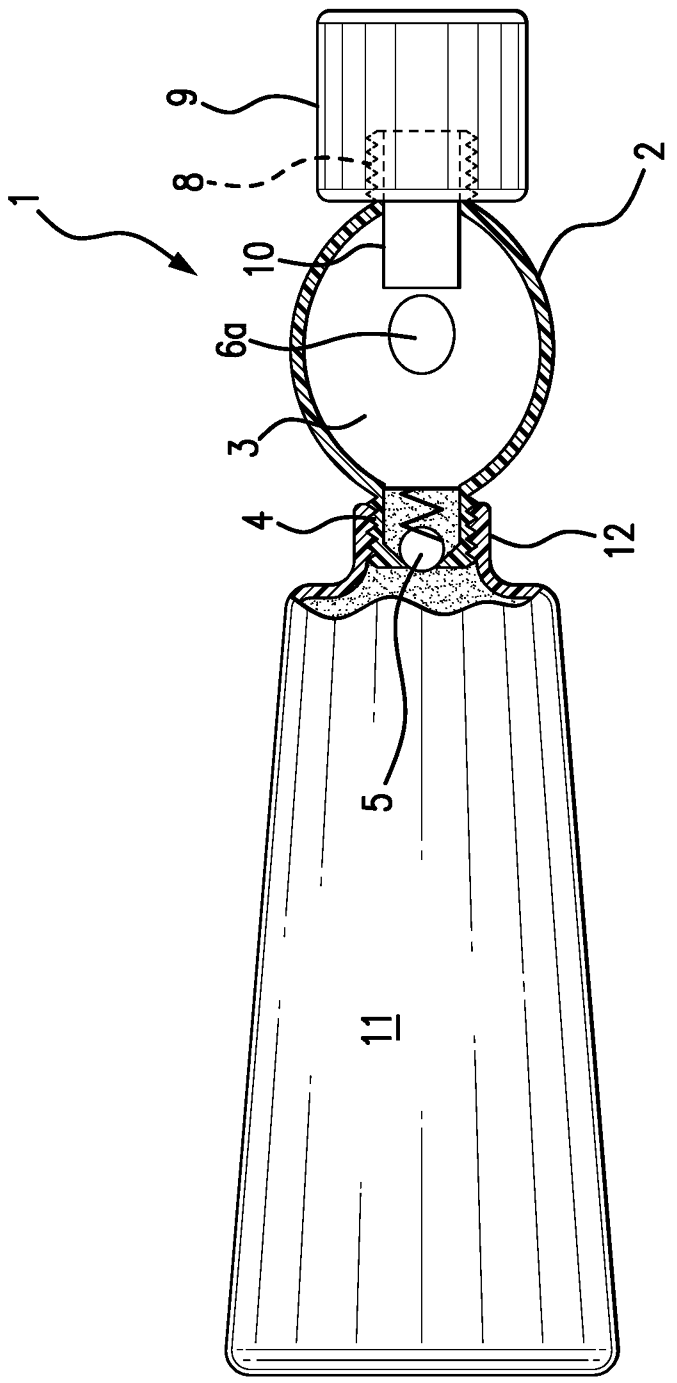
FIG. 1 shows a side/cross-sectional view of the pill swallowing device including liquid fill reservoir and cap.

This invention relates to a method and device for assisting people and animals in the swallowing of a capsule, tablet, or pill. In one embodiment, the present disclosure relates to a pill swallowing device comprising a deformable reservoir for holding an edible liquid; a liquid refilling port attached to the deformable reservoir; a pill transit port for loading and discharging pills attached to the deformable reservoir; and a cap detachably connected to the pill transit port, the cap comprising a pill-positioning insert that projects into the deformable reservoir for directing the pill inside the reservoir. For the purposes of the description of this invention, the term "pill" will be used to describe a pill, tablet, or capsule or any other pharmaceutical, nutraceutical or nutritional supplement product to be delivered in a discrete solid form or in encapsulated form, via swallowing.

The pill swallowing device is a refillable, washable device with a deformable reservoir for holding a flavored, edible, liquid that can be used to coat a solid pharmaceutical that can be squeezed into a person's or animal's mouth for ease of swallowing, improved aftertaste, reduced mess, and improved hygiene. The device may be disassembled for washing with detergent by hand or in a dishwasher. The deformable reservoir holds edible liquid that will coat the pill. The deformable reservoir is typically configured in a shape that is easily squeezed in the hand and efficiently coats the pill, and then facilitates transport of the coated pill out through the pill transit port. Typically, the deformable reservoir can be spherical, spheroidal, cylindrical, oblate spheroidal, prolate spheroidal, barrel-shaped, ovoid, or ellipsoidal. The materials of construction for the pill swallowing device, described below, should allow repeated squeezing of the deformable reservoir without failure or embrittlement of the material.

Materials of Construction

Appropriate combination of polymer and manufacturing method are used in the practice of this invention. Since it is desirable that the device be dishwasher safe, the material of choice should be resistant to detergent, high pH, water, and heat. The polymer should also be resistant to and non-leaching upon exposure to the various types of edible lubricants to which it could be exposed. The polymer should also be flexible enough to act as a "pump" capable of being compressed and then recovery, thereby having good hysteresis without damaging the device. The compression of the device should be relatively easy to accomplish by diminished-capacity human hands, as patients may have conditions that cause hand weakness or hand pain, such as arthritis. Note that the pill swallowing device design can economically accommodate this pumping/suction performance with durability by selecting wall thickness and material of construction. Further, the type of plastic and its final formulation should contain no leachable toxic substances including lead, phthalates, bisphenol A, dioxane, cadmium, benzene, toluene, residual unreacted ethylene glycol or diethylene glycol, residual unreacted vinyl chloride, ethylene dichloride, tin compounds, halogenated fire retardants, certain amine compounds, and dioxins as examples.

Typical materials of construction for the pill swallowing device include medical grade polymers such as poly(vinyl chloride) (PVC), silicones, polypropylene, ethylene copolymers, ultrahigh-molecular-weight polyethylene, high density polyethylene, low-density polyethylene, poly(4-methyl-1-pentene), cyclic olefin copolymers, polystyrene, thermoplastic elastomers such as styrenic, olefinic, urethane, ether-ester, and ether-amide, poly(vinyl pyrrolidone), polyacrylonitrile, poly(vinyl alcohol), ethylene-vinyl alcohol copolymers, poly(methyl methacrylate), poly(2-hydroxyethyl methacrylate), copolymers of with methyl methacrylate, tartaric acid based polymers, aliphatic polyamides (nylons), polyphthalamide, poly(ethylene terephthalate), flexible polyesters, polyurethanes, polycarbonate, polyoxymethylene (acetal), poly(ethylene oxide), liquid crystalline polymers, poly(ether ether ketone) and related copolymers, polyimide, poly(phenylene sulfide), polyetherimide, poly(phenylene sulfone), poly(ether sulfone), polysulfone, cyanoacrylate thermosets, natural rubber, synthetic rubbers and elastomers, polyetrafluoroethylene (PTFE, Teflon), expanded PTFE (Gore-Tex®), poly(vinylidene fluoride), perfluoroether synthetic oils and greases, specialty fluoropolymer additives, poly(dimethyl siloxane), poly(p-xylylene) (Parylene) coatings, polymer matrix nanocomposites, and biosorbables, such as poly(lactic acid), poly(glycolic acid), poly(ε-caprolactone), and related copolymers.

Preferably, polymers that are suitable for the pill swallowing device include silicones, polydimethylsiloxanes, polyethylenes, polypropylenes, polybutylene terephthalate, polyvinyl chloride, ethylene copolymers with various acrylates, (meth)acrylic acid or vinyl acetate, poly(4-methyl-1-pentene), polyurethanes, polyether/esters, thermoplastic elastomers (styrenic, olefinic, urethane, ether-ester, ether-amide), natural rubber, synthetic rubbers and elastomers, and fluorinated elastomers.

More preferably, the materials of construction are poly (dimethyl siloxane), ethylene copolymers, silicones, and the thermoplastic elastomers (styrenic, olefinic, urethane, ether-ester, and ether-amide).

Methods for constructing the pill swallowing device include injection molding, compression molding, liquid silicone molding, casting, blow molding, assembly using adhesives, additive manufacturing (3D printing), vacuum molding, pour-in-place molding profile thermoplastic extrusion, reaction injection molding and combinations thereof.

The deformable reservoir can be equipped with a vent hole to facilitate filling of the reservoir with fresh edible liquid. When the vent hole is present, the deformable reservoir can be equipped with a vent hole cap and a flap connected on one end to the vent hole cap and on the other to the deformable reservoir, preferably onto a ring on the outside surface of the deformable reservoir proximate to the vent hole. This allows the vent hole to be used when necessary, then covered when not, and the connecting flap prevents it from becoming separated from the device and lost.

The deformable reservoir holds edible liquid and is equipped with a liquid refilling port and a pill transit port. The liquid refilling port and pill transit port are attached to the deformable reservoir, and can be fixed to the deformable reservoir as a result of the original molding of the pill swallowing device or fixed, e.g., by use of an appropriate adhesive. The liquid refilling port facilitates replacement of the edible liquid that is used during normal operation. It's configuration should facilitate easy resupply of the edible liquid, as well as permit detachable connection with the liquid refilling container or the refill port cap. Such detachable connection includes, for example, the liquid refilling port having a threaded cylindrical connection, or a pressure fit. The liquid refilling port can be equipped with a one-way valve positioned in its interior. The one-way valve permits liquid flow in only one direction, and prevents back-flow of edible liquid from the deformable reservoir to the fresh edible liquid in the liquid refilling container, thereby protecting the hygiene of the edible liquid. When not in use, the liquid refilling container can be sealed with the cap.

The pill transit port both initially receives the pill prior to coating and facilitates transporting the coated pill out of the pill swallowing device into the mouth of the patient. For the purpose of this specification, the term "patient" includes humans and animals. The configuration of the pill transit port should facilitate initial placement of the pill for coating inside the deformable reservoir, and easy exit of the pill from the port. It should be capable of having a detachable connection with the cap and allow the pill positioning insert to direct the pill inside the deformable reservoir. Such detachable connection includes, for example, the pill transit port having a threaded cylindrical connection, or a pressure fit. The pill transit port should be configured such that it is wide enough to provide easy transport of the pill, but not so large that excessive edible liquid is ejected with the pill. The pill transit port can either be fixed to the deformable reservoir, e.g., with glue or other adhesives, or made part of the deformable reservoir as a result of the formation of the deformable reservoir, e.g., the molding operation. Alternately, the pill transit port can be detachably connected to the deformable reservoir to allow changing the size of the pill transit port to accommodate different size pills. For example, the pill transit port can be attached via a threaded connection, a snap-on connection or pressure fit, provided that the pill transit port cannot unintentionally be detached so as to prevent any risk in choking.

Figure 9:
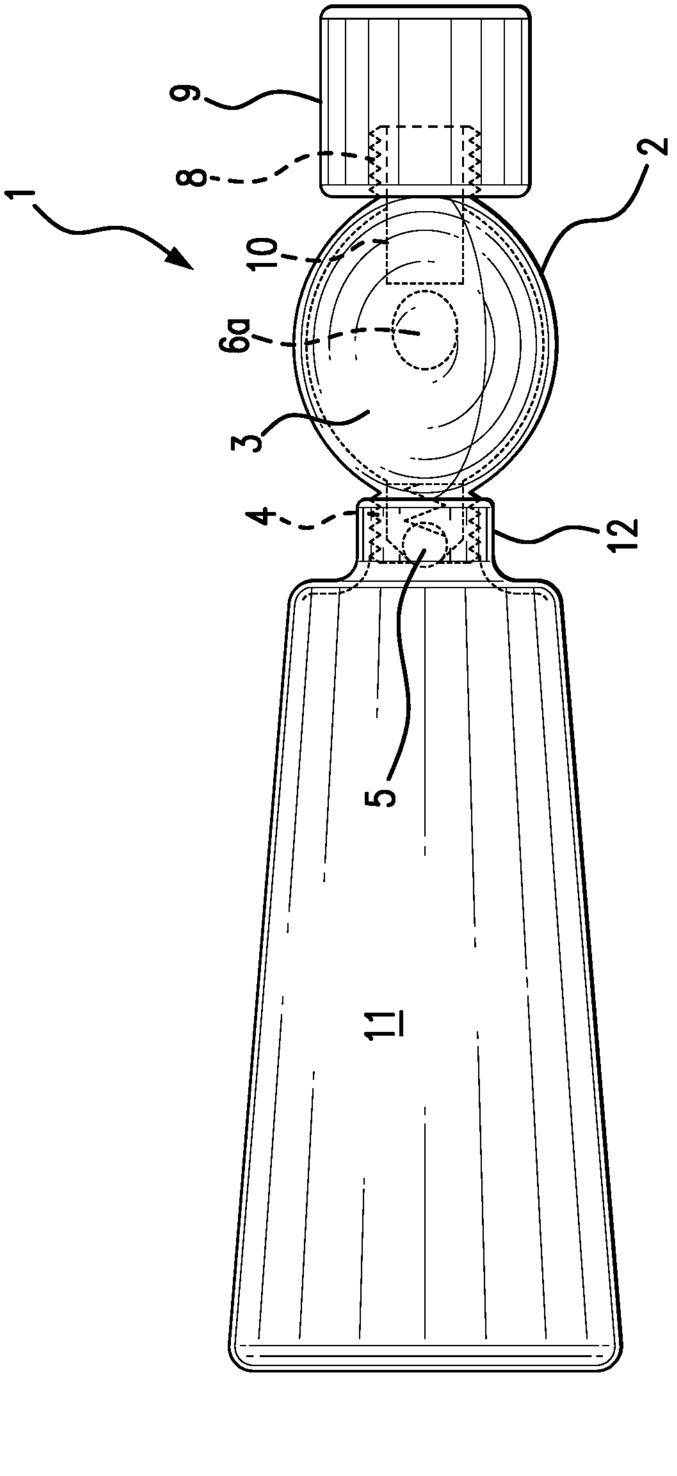
FIG. 9 shows a perspective view the pill swallowing device with liquid refill container and cap.

The pill transit port and the liquid refilling port can be located anywhere on the surface of the deformable reservoir relative to one another. Preferably, the pill transit port and liquid refilling port can be located along the longitudinal axis of the deformable reservoir at an angle of 0 to 20° to the longitudinal axis After initial placement of the pill in the pill transit port, the cap is then detachably connected to the pill transit port, e.g., when the cap is configured with a threaded connection the cap is screwed on. The cap is equipped with a pill positioning insert attached to the top of the cap. The pill positioning insert is generally rod-shaped and configured to slide within the pill transit port, thereby pushing and positioning the pill inside the deformable reservoir, as shown in FIG. 9. It is desirable that the pill be positioned in such a way as to be uniformly covered with liquid on all its surfaces. The cap preferably contains an inner annular section between the outer surface of the pill positioning insert and the interior of the cap, e.g., the interior wall of the cap has a threaded connection that mates with the threaded connection of the pill transit port. The length of the pill positioning insert adjusts the depth of insertion inside the deformable reservoir. This in turn can affect the amount of edible liquid that is ejected with the pill. In some circumstances it may be desirable to minimize the amount of edible liquid ejected with the pill, so that the distance the pill is directed inside the deformable reservoir is also minimized. In this case the pill positioning insert may only project into the pill transport port without substantially entering the deformable reservoir, as shown in FIG. 4B.

The pill positioning insert is typically configured to accommodate the shape of the pill transit port, e.g., rod-like, cylindrical, or cone shaped. The length of the insert can be selected to direct the pill to the correct position in the deformable reservoir. The pill positioning insert can be equipped with a raised annular ring on the periphery of one end of the rod or cylinder, forming a flat bowl-shaped receiver for engaging the pill. This allows the pill to be placed in the deformable reservoir in a more stable fashion. Alternately, the pill positioning insert can be equipped with cradle pins installed around the periphery of one end of the rod or cylinder, together forming a cradle for the pill. This again helps position the pill in a more stable fashion.

In another embodiment, the present disclosure provides a method for administering a pill to a patient using the pill swallowing device, the method comprising filling a deformable reservoir with an edible liquid; placing a pill in the pill transit port; attaching the cap to the pill transit port, wherein the pill-positioning insert engages the pill, and directs the pill into the edible liquid in the deformable reservoir, thereby coating the pill with edible liquid; removing the cap, and squeezing the deformable reservoir to push the edible liquid-coated pill into the mouth of a patient, i.e., a person or animal, for the purpose of swallowing. The resulting pill exiting the device is uniformly and completely coated with edible liquid having been immersed in it during insertion into the deformable reservoir.

The edible liquid that is used to coat the pill can include flavoring agents, preservatives, opacifying agents, edible colorants, thickeners, lubricants or mixtures thereof.

Flavoring Agents

The edible liquid can be flavored to reduce any aftertaste that might be emitted by the pill, and/or entice the patient to swallow the pill. A wide range of popular flavors exist for masking aftertaste in orally delivered liquid pharmaceutical, nutraceutical or nutritional supplement products with adults, children, and animals. Examples include menthol, peppermint, spearmint, cherry, honey, raspberry, lemon, lime, grape, orange, vanilla, chocolate, caramel, strawberry, blueberry, beef, sugars, propylene glycol, glycerin, calcium chloride, sodium chloride, artificial sweeteners, fish, potassium chloride, chicken, pork, bacon, cheese, turkey, and combinations thereof.

Preservatives

The edible liquid can contain edible preservative to maintain the freshness of the product and discourage bacterial growth. Examples of edible preservatives include sodium benzoate, citric acid, sodium citrate, potassium sorbate, sodium nitrate, sodium nitrite, sulfites, sulfur dioxide, sodium chloride, benzoic acid, propionic acid, sodium propionate, lactic acid, sorbic acid, calcium chloride and honey.

Opacifying Agents

The edible liquid can also contain an edible opacifying agent for the purpose of giving the edible lubricant either a hiding effect to disguise the fact that there is a pill present in the edible lubricant, for example, when administering a pill to a child or animal. Examples of opacifying agents suitable for the practice of this invention include calcium sulfate; zinc stearate; titanium dioxide; and starch.

Edible Colorants

The edible liquid may contain an edible colorant to provide the edible lubricant with fun or desirable visual effect for children, in particular. Examples of edible colorants include: Caramel coloring (E150a-d), made from caramelized sugar; Carmine (E120), a red dye derived from the cochineal insect, Dactylopius coccus; Elderberry juice (E163); Lycopene (E160d); Paprika (E160c); Turmeric/Curcumin (E100)E104: Quinoline Yellow; E122: Carmoisine; E124: Ponceau 4R; E131: Patent Blue V; E142: Green S; FD&C Blue No. 1—Brilliant Blue FCF, E133 (blue shade); FD&C Blue No. 2—Indigotine, E132 (indigo shade); FD&C Green No. 3—Fast Green FCF, E143 (turquoise shade); FD&C Red No. 3—Erythrosine, E127 (pink shade, commonly used in glacé cherries); FD&C Red No. 40—Allura Red AC, E129 (red shade); FD&C Yellow No. 5—Tartrazine, E102 (yellow shade); and FD&C Yellow No. 6—Sunset Yellow FCF, E110 (orange shade).

Thickeners

Thickeners may be used in the edible liquid to adjust the viscosity of the lubricant to provide a more uniform coating on the pill, as well as to enhance the stickiness of the lubricant to the pill. Examples of edible thickeners include polysaccharides (starches, vegetable gums, and pectin) and proteins. An example of flavorless powdered starch used for this purpose is a fecula. Fecula includes starches such as arrowroot, cornstarch, katakuri starch, potato starch, sago, wheat flour, almond flour, tapioca, and their starch derivatives. Microbial and vegetable gums used as edible thickeners include alginin, guar gum, locust bean gum, and xanthan gum. Proteins used as food thickeners include collagen, egg whites, and gelatin. Sugar polymers include agar, carboxymethyl cellulose, hydroxypropyl methylcellulose, pectin, and carrageenan. Combinations of thickeners may also be used.

Lubricating Agents

Finally, the edible liquid can contain edible lubricating ingredients including glycerin, propylene glycol, polyethylene glycol, hydroxypropyl methylcellulose and water. Additionally, many of the thickeners, when dissolved in water, can also act as lubricants. If the edible liquid is a liquid, then it is preferable for that liquid to have a viscosity greater than about 200 cps, greater than about 1000 cps, greater than about 5000 cps, greater than about 10,000 cps or greater than about 20,000 cps.

Preferably, the edible liquid is in the form of an oil, emulsion or gel. Preferably, the edible liquid is flavored, scented or a combination thereof.

Referring now to FIG. 1, shown is a side/cross-sectional view of pill swallowing device 1 containing a deformable reservoir 2 for holding an edible liquid 3, a liquid refilling port 4 attached to the deformable reservoir 2, a pill transit port 8 for loading and discharging pills 6a attached to the deformable reservoir 2, a cap 9 detachably connected to the pill transit port 8, the cap 9 having a pill-positioning insert 10 for directing the pill inside the reservoir. A liquid refill container 11 having a refill container nozzle 12 is connected to the liquid refilling port 4. A one-way valve 5 is attached to the liquid refilling port 4 for preventing liquid flow from the deformable reservoir into the liquid refill container.

Figure 2:
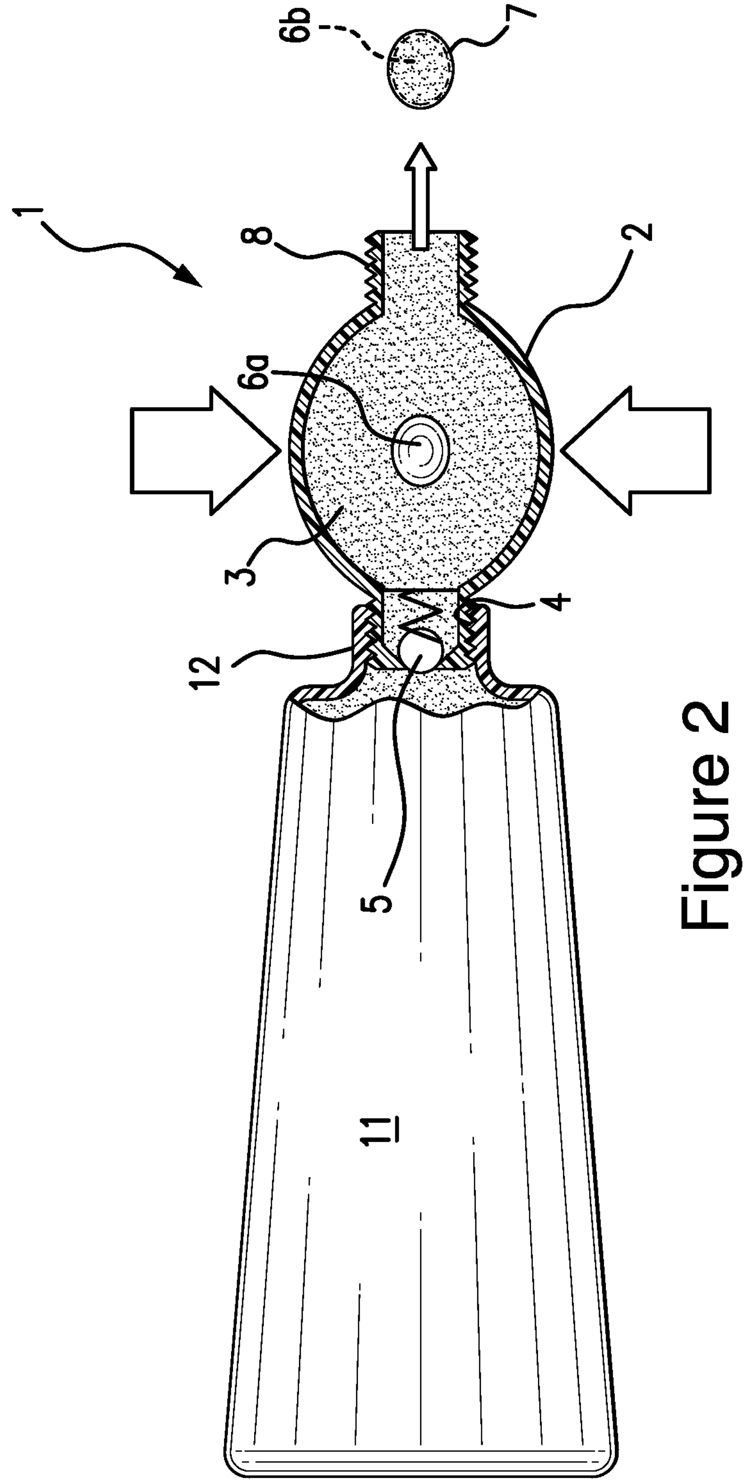
FIG. 2 shows a side/cross-sectional view of the pill swallowing device where squeezing of the deformable reservoir extrudes the coated pill from the device.

Referring now to FIG. 2, shown is a side/cross-sectional view of a pill swallowing device 1 containing a deformable reservoir 2 for holding an edible liquid 3, a liquid refilling port 4 attached to the deformable reservoir 2, a pill transit port 8 for loading and discharging pills 6*a*, 6*b*, attached to the deformable reservoir 2, a liquid refilling port 4 attached to the deformable reservoir 2. A liquid refill container 11 having a refill container nozzle 12 which is attached to the liquid refilling port 4. A one-way valve 5 is attached to the liquid refilling port 4 for preventing liquid flow from the deformable reservoir into the liquid refill container. Pill 6*a* is placed in the deformable reservoir 2 using cap 9 (not shown) filled with edible liquid 3, thereby coating the pill 6*b*. By squeezing the deformable reservoir 2 the pill 6*b* is ejected from the deformable reservoir 2 into the mouth of the patient. The edible liquid coating 7 on the surface of the pill 6*b* makes the pill 6*b* easier to swallow.

Figure 3A:
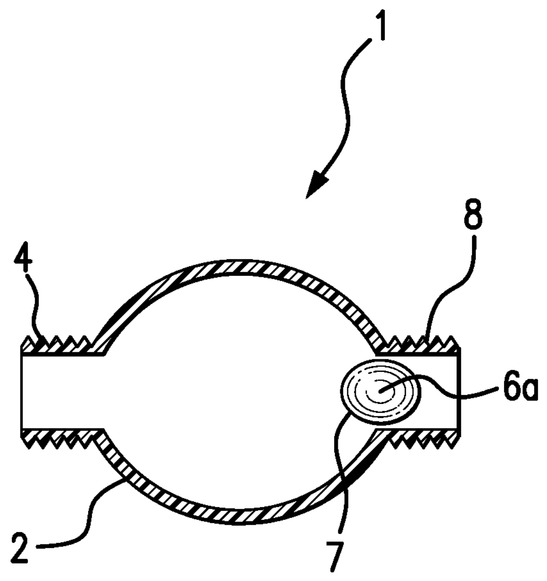
FIG. 3A shows a cross-sectional view of a deformable reservoir having an oval shape.
Figure 3B:
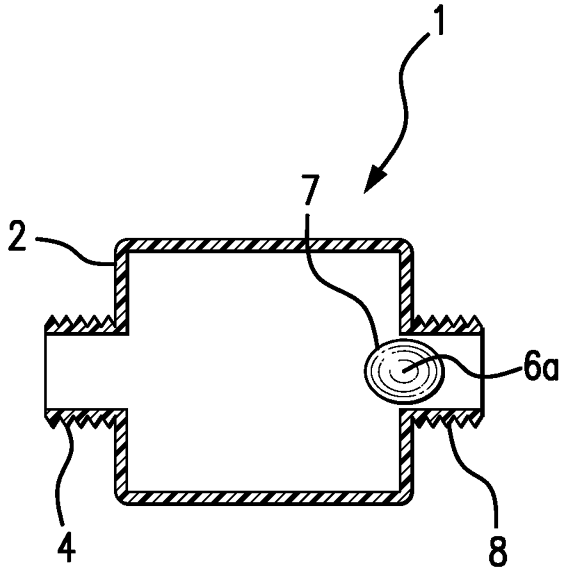
FIG. 3B shows a cross-sectional view of a deformable reservoir having a cylindrical shape.

Referring now to FIGS. 3A and 3B, both show two shapes of the pill swallowing device 1. Each of the devices has a deformable reservoir 2, pill transit port 8, liquid refilling port 4, pill 6*a* and coating of edible liquid 7 on the pill 6*a*. The difference is the shape of the deformable reservoir 2. FIG. 3A illustrates a spheroidal shaped deformable reservoir 2. FIG. 3B illustrates a cylindrical shaped deformable reservoir 2. Other possible shapes include spherical, oblate spheroidal, prolate spheroidal, barrel-shaped, ovoid, or ellipsoidal. The shape may also be a sphere.

Figure 4A:
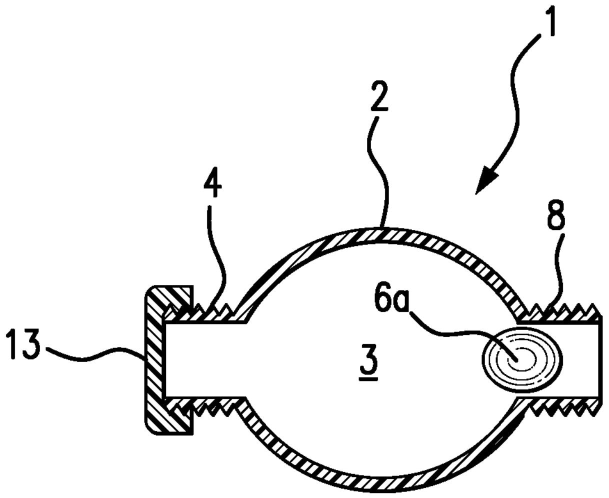
FIG. 4A shows a cross-sectional view of a deformable reservoir including a refill port cap.
Figure 4B:
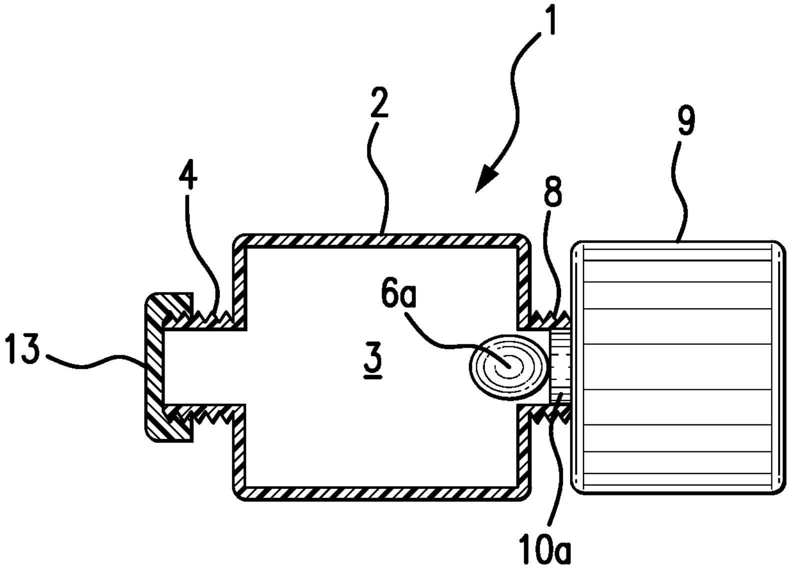
FIG. 4B shows a cross-sectional/side view of a deformable reservoir including cap and refill port cap.

Referring now to FIGS. 4A and 4B, these show the cross-section views of FIGS. 3A and 3B with connections to liquid refilling port 4 and pill transit port 8 connected to the deformable reservoir 2. Edible liquid 3 resides in the deformable reservoir 2 as well as pill 6*a*. Both FIGS. 4A and 4B show refill port cap 13 detachably connected to refilling port 4. FIG. 4B additionally shows cap 9 detachably connected to pill transit port 8. Pill positioning insert 10*a* is connected to cap 9.

Figure 5:
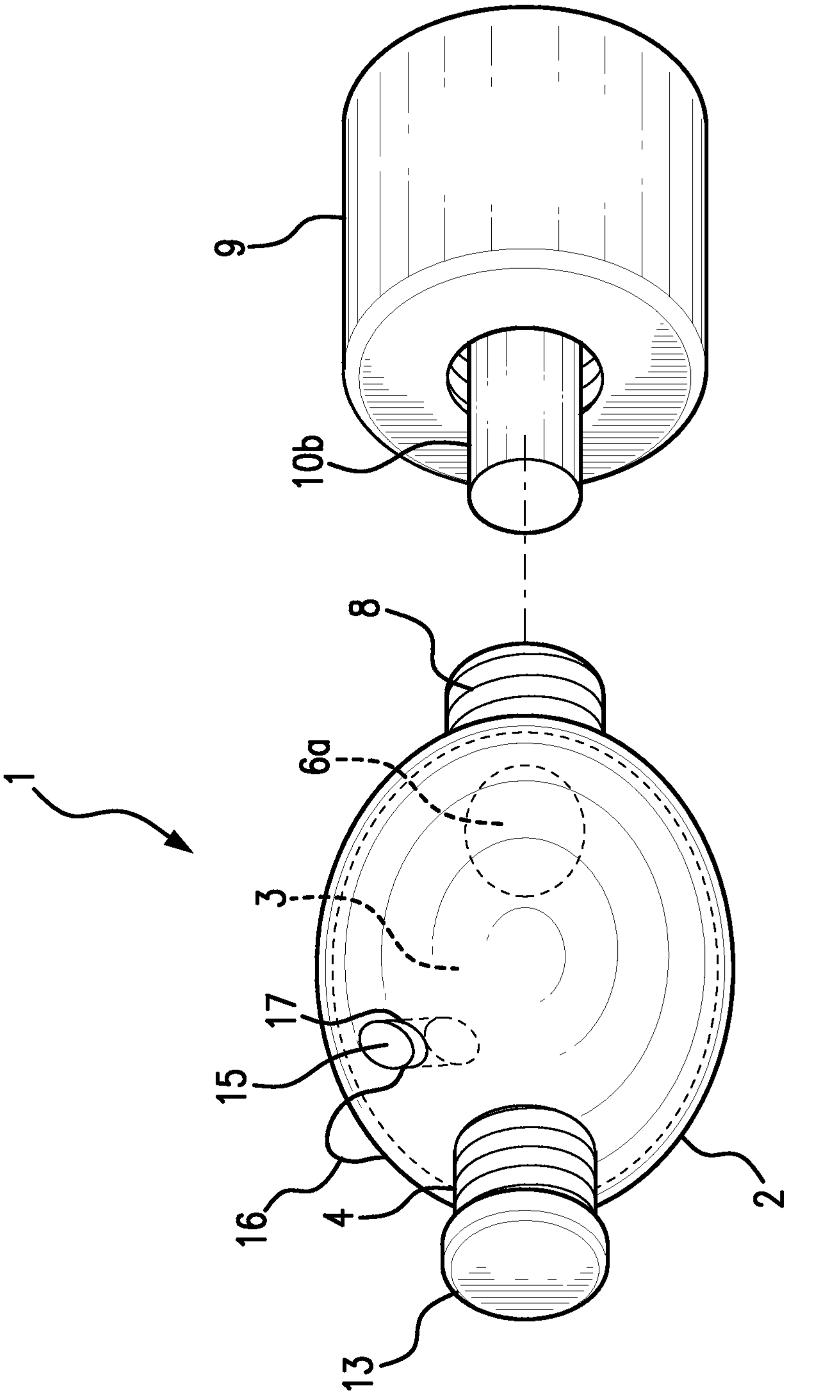
FIG. 5 shows a perspective view of a deformable reservoir including cap, along with vent hole, vent cap and flap.

Referring now to FIG. 5, it shows a perspective view of pill swallowing device 1 having deformable reservoir 2 with liquid refilling port 4 and pill transit port 8 being connected to the deformable reservoir 2. Edible liquid 3 resides in the deformable reservoir 2 along with pill 6*a*. Vent hole 17 is positioned on the surface of the deformable reservoir 2, flap 16 is attached to both vent cap 15 on one end the deformable reservoir 2 on the other. Preferably, the flap is attached to the portion of the deformable reservoir 2 surrounding the vent hole 17, e.g., with a ring. In this way, the vent cap 15 can be detachably connected to vent hole 17, however, when not connected to vent hole 17 the vent cap 15 cannot be misplaced or lost. Pill positioning insert 10*b* connected to cap 9 is shown positioned so that pill positioning insert 10*b* can be placed inside pill transit port 8 and cap 9 detachably connected to pill transit port 8. In this case, pill transit port 8 has a threaded connection that is mated to the threaded connection in cap 9, so that as cap 9 is tightened, pill positioning insert 10*b* engages and pushes/directs pill 6*a* into the deformable reservoir 2.

Figure 6:
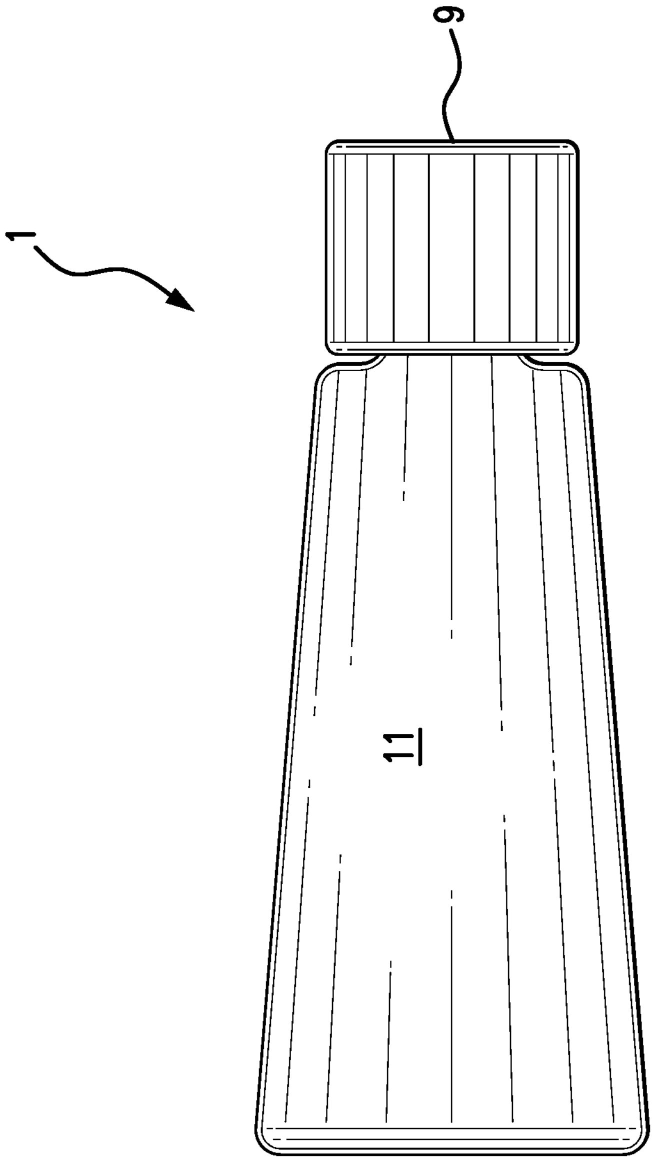
FIG. 6 shows a side view of a pill swallowing device configured for storage or travel where the liquid refill container is capped.

Referring now to FIG. 6, it shows a perspective view of the pill liquid refill container 11 connected directly to cap 9.

Figure 7:
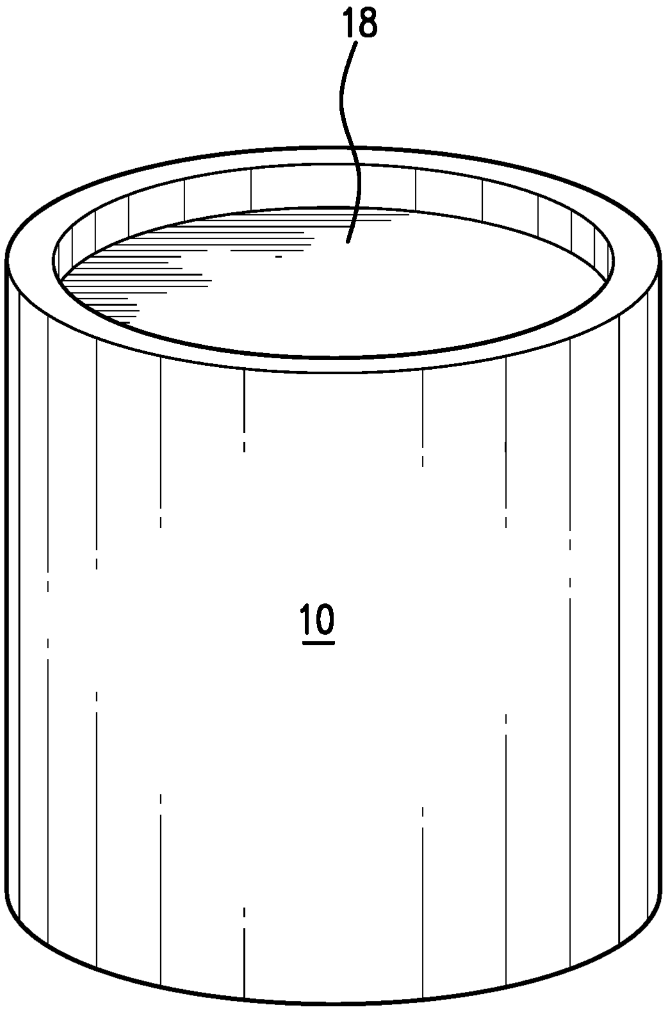
FIG. 7 shows a perspective view of the pill positioning insert with a flat bowl-shaped receiver at one end of the cylinder.

Referring now to FIG. 7, it shows a perspective view of pill positioning insert 10, the insert being cylindrical in shape with a raised annular ring on the periphery of one end of the cylinder, forming a flat bowl-shaped receiver 18 for the pill to facilitate engaging and directing the pill into the deformable reservoir.

Figure 8:
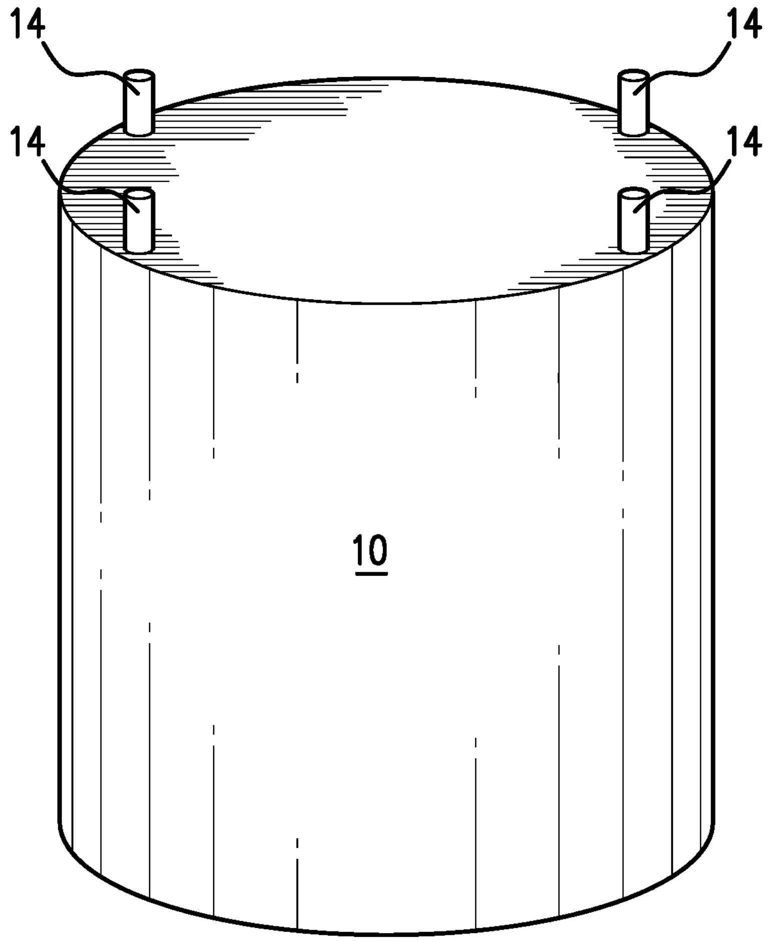
FIG. 8 shows a perspective view of the pill positioning insert with cradle pins.

Referring now to FIG. 8, it shows a perspective view of pill positioning insert 10, the insert being cylindrical in shape with cradle pins 14 installed around the periphery of one end of the cylinder, together forming a cradle for the pill.

Referring now to FIG. 9, it shows a perspective view of pill swallowing device 1 containing a deformable reservoir 2 for holding an edible liquid 3, a liquid refilling port 4 attached to the deformable reservoir 2, a pill transit port 8 for loading and discharging pills 6*a* attached to the deformable reservoir 2, a cap 9 detachably connected to the pill transit port 8, the cap 9 having a pill-positioning insert 10 for directing the pill inside the reservoir. A liquid refill container 11 having a refill container nozzle 12 is connected to the liquid refilling port 4. A one-way valve 5 is attached to the liquid refilling port 4 for preventing liquid flow from the deformable reservoir into the liquid refill container.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be affected without departing from the spirit and scope of the invention as described and claimed.

I claim:

1. A pill swallowing device comprising:

a deformable reservoir comprising a flexible polymer holding an edible lubricant, wherein the deformable reservoir has a flexible wall defining a shape, and acts as a pump configured to compress and recover to the shape after compression;

a liquid refilling port attached to the deformable reservoir;

a liquid refill container attached to the liquid refilling port that holds the edible lubricant;

a pill transit port for loading and discharging pills attached to the deformable reservoir;

a cap detachably connected to the pill transit port, the cap comprising a pill-positioning insert, which projects into the deformable reservoir for engaging the pill and pushing and positioning the pill inside the reservoir, wherein the pill-positioning insert is rod-shaped and configured to slide within the pill transit port; and a one-way valve attached to the liquid refilling port comprising a spring loaded, ball-shaped element for preventing liquid flow from the deformable reservoir into the liquid refill container, the edible lubricant having a viscosity of greater than about 200 cps.

2. The pill swallowing device of claim 1 wherein the deformable reservoir comprises a vent hole.

3. The pill swallowing device of claim 1 wherein the edible lubricant is in the form of an oil, emulsion, liquid or gel, comprising glycerin, propylene glycol, polyethylene glycol, hydroxypropyl methylcellulose or mixtures thereof.

4. The pill swallowing device of claim 3 wherein the edible liquid is flavored, scented or a combination thereof.

5. A method for administering a pill using the device of claim 1, the method comprising:

filling the deformable reservoir with the edible liquid;

placing the pill in the pill transit port;

attaching the cap to the pill transit port, wherein the pill-positioning insert engages the pill, and directs the pill into the edible lubricant, thereby coating the pill with edible lubricant;

removing the cap from the pill transit port; and squeezing the deformable reservoir to push the edible lubricant coated pill into the mouth of a person or animal for the purpose of swallowing.

6. The method of claim 5 wherein the edible lubricant is in the form of an oil, emulsion, liquid or gel.

7. The method of claim 6 wherein the edible lubricant is flavored, scented or a combination thereof.

8. The pill swallowing device of claim 1 wherein the flexible polymer is selected from an elastomer or silicone.

9. The pill swallowing device of claim 8 wherein the flexible polymer is silicone.

10. The pill swallowing device of claim 1 wherein the device is dishwasher safe.

* * * * *